(No Model.)

C. FEIL.
CONNECTING ROD FOR BRAKE BEAMS.

No. 428,333. Patented May 20, 1890.

WITNESSES:
John M. Deemer
C. Sedgwick

INVENTOR:
C. Feil
BY Munn & Co.
ATTORNEYS

THE NORRIS PETERS CO., PHOTO-LITHO., WASHINGTON, D. C.

UNITED STATES PATENT OFFICE.

CHRISTIAN FEIL, OF NEW UTRECHT, NEW YORK.

CONNECTING-ROD FOR BRAKE-BEAMS.

SPECIFICATION forming part of Letters Patent No. 428,333, dated May 20, 1890.

Application filed March 29, 1890. Serial No. 345,903. (No model.)

*To all whom it may concern:*

Be it known that I, CHRISTIAN FEIL, of New Utrecht, in the county of Kings and State of New York, have invented a new and improved Connecting-Rod for Brake-Beams for Cars, of which the following is a full, clear, and exact description.

My invention consists of an improved connecting-rod for brake-beams for street and other cars, said rod being so constructed as to effect a perfectly secure and safe connection with the beam without in any manner enlarging, boring, or recessing the beam, as is now the practice.

Reference is to be had to the accompanying drawings, forming a part of this specification, in which similar letters of reference indicate corresponding parts in all the figures.

Figure 1:
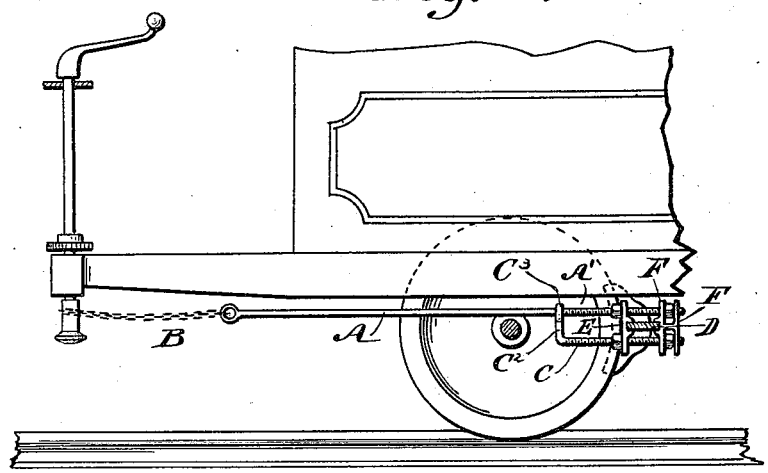
Figure 2:
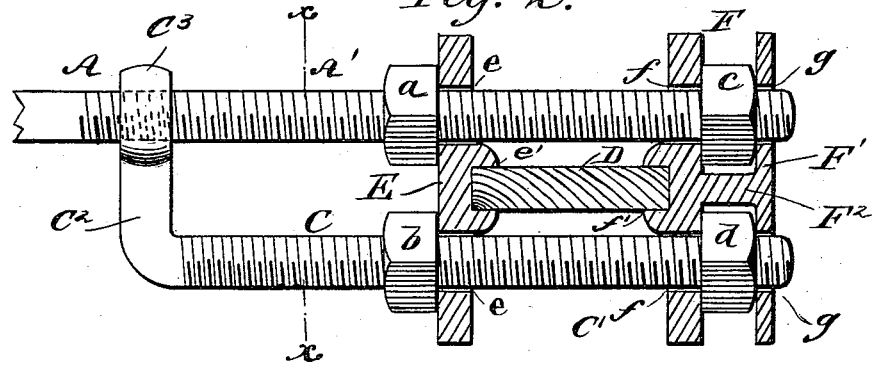
Figure 3:
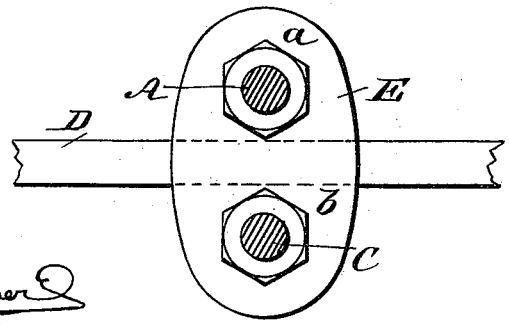

Figure 1 is a side elevation of my invention shown applied to a car, the car-axle and the brake-beam being shown in section. Fig. 2 is an enlarged sectional elevation of my invention and the brake-beam to which it is applied, and Fig. 3 is a sectional elevation on line $x\ x$ of Fig. 2.

A represents a straight rod screw-threaded at A' and adapted to be connected to the chain B or other operating mechanism of the brake. Attached to the rod A is the supplemental rod C, screw-threaded at C' and bent to form the lateral arm $C^2$ and eye $C^3$, which latter is secured to the rod A in this instance by internal screw-threads and the screw-threads A'. The rods A C span the brake-beam D, and are made fast thereto by the front clamp-plate E and rear clamp-plate F and the nuts $a\ b\ c\ d$. The clamp-plate E is apertured at $e\ e$ for the rods A C, and is formed with a recess or notch $e'$ to embrace the edge of the brake-beam D, as shown clearly in Fig. 2.

The rear clamp-plate is apertured at $f\ f$ for the rods A C, and is recessed or notched at $f'$ to embrace the rear edge of the brake-beam D. It is also formed with the plate F', which serves to retain the nuts $c\ d$ on the main rods, so that detachment of the rods from the brake-beam is impossible. The said plate F is apertured at $g\ g$ for the ends of the rods and is by preference made integral with the main part of the clamp-plate, a web $F^2$ serving as a connection.

By employing the clamp-plates and the nuts I am enabled to use a perfectly-plain brake-beam, which saves extra labor and cost in construction and fitting and the beam is of equal strength throughout.

Having thus fully described my invention, I claim as new and desire to secure by Letters Patent—

1. The main rod having attached thereto a bent supplemental rod combined with the notched clamp-plates applied to said rods, one at each edge of the brake-beam, substantially as described.

2. The main rod A, screw-threaded at A', and the supplemental bent rod C, screw-threaded at C' and screwed upon the rod A, in combination with the nuts $a\ b$, clamp-plates E F, and nuts $c\ d$, substantially as described.

3. The main rod A and bent supplemental rod C, both screw-threaded, combined with the nuts $a\ b\ c\ d$, and the clamp-plates E F, the latter formed with the plate F' to retain the nuts $c\ d$, substantially as described.

4. The clamp-plate F, formed with the notch $f'$, web $F^2$, and the guard-plates of flanges F', substantially as described.

CHRISTIAN FEIL.

Witnesses:
 MICHAEL FEIGEL,
 FREDRICK A. NITSCHKE.